(12) United States Patent  (10) Patent No.: US 8,379,343 B2
Cheng et al.  (45) Date of Patent: Feb. 19, 2013

(54) TAPE STORAGE SLOT

(75) Inventors: Heng Kuang Cheng, Singapore (SG); Chee Teck Ong, Singapore (SG); Kar Woh Fok, Singapore (SG); Eng Kuan Eikky Lim, Singapore (SG)

(73) Assignee: Venture Corporation Limited, Singapore (SG)

( * ) Notice: Subject to any disclaimer, the term of this patent is extended or adjusted under 35 U.S.C. 154(b) by 263 days.

(21) Appl. No.: 12/921,086

(22) PCT Filed: Mar. 5, 2009

(86) PCT No.: PCT/SG2009/000080
§ 371 (c)(1),
(2), (4) Date: Sep. 3, 2010

(87) PCT Pub. No.: WO2009/110851
PCT Pub. Date: Sep. 11, 2009

(65) Prior Publication Data
US 2011/0000863 A1   Jan. 6, 2011

(30) Foreign Application Priority Data
Mar. 5, 2008 (SG) .............................. 200801947-3

(51) Int. Cl.
*G11B 15/675*   (2006.01)
(52) U.S. Cl. .................................................. 360/92.1
(58) Field of Classification Search ................. 360/92.1
See application file for complete search history.

(56) References Cited

U.S. PATENT DOCUMENTS

| 3,856,369 | A | | 12/1974 | Commiant |
| 5,021,902 | A | * | 6/1991 | Ishikawa et al. ............. 360/92.1 |
| 5,532,888 | A | * | 7/1996 | Acosta et al. ................ 360/92.1 |
| 5,936,795 | A | * | 8/1999 | Theobald et al. ............ 360/92.1 |
| 6,019,230 | A | | 2/2000 | Hayashi |
| 6,141,180 | A | * | 10/2000 | Smith ........................ 360/96.51 |
| 6,155,659 | A | | 12/2000 | Manes et al. |
| 6,328,766 | B1 | | 12/2001 | Long |
| 6,353,581 | B1 | | 3/2002 | Offerman et al. |
| 6,781,789 | B2 | * | 8/2004 | Ostwald ...................... 360/92.1 |
| 7,236,326 | B2 | * | 6/2007 | Herring et al. .............. 360/92.1 |
| 7,424,957 | B1 | * | 9/2008 | Luberto ....................... 211/59.3 |
| 7,580,220 | B1 | * | 8/2009 | Grow et al. ................. 360/92.1 |
| 7,839,601 | B2 | * | 11/2010 | Nave et al. .................. 360/92.1 |
| 2007/0230036 | A1 | * | 10/2007 | Nave et al. ...................... 360/92 |

FOREIGN PATENT DOCUMENTS
GB   1306998   2/1973

OTHER PUBLICATIONS

International Search Report for International Application PCT/SG2009/000080 (International Publication WO 2009/110851); 3 pages.

* cited by examiner

*Primary Examiner* — Mark Blouin
(74) *Attorney, Agent, or Firm* — Beem Patent Law Firm

(57) ABSTRACT

A slot for releasably storing a tape cartridge is disclosed. The slot comprises an enlargeable receiving portion for releasable insertion of the tape cartridge and a plate for supporting the tape cartridge in the slot. At least a portion of the plate is moveable for enlarging the receiving portion.

25 Claims, 10 Drawing Sheets

TAPE STORAGE SLOT

CROSS-REFERENCE TO RELATED APPLICATIONS

This application is a U.S. national stage application of PCT application PCT/SG2009/000080, filed Mar. 5, 2009, and claims the benefit of priority from Singapore patent application 200801947-3, filed Mar. 5, 2008.

TECHNICAL FIELD

This invention relates generally to a tape storage slot and relates more particularly, though not exclusively, to a tape storage slot in a tape library.

BACKGROUND

Tape libraries for storing tape cartridges normally come in a range of standard sizes. Given constraints in space and the ever-increasing amount of data to be stored, there is a demand for storing as many tape cartridges in a tape library as possible. As each tape cartridge is stored in its own slot, maximizing the number of tape cartridges stored in a tape library may be readily achieved by minimizing the space occupied by each slot.

To minimize the space occupied by each slot, the clearance between slots, and between a tape cartridge and its slot, needs to be correspondingly reduced. Currently, there remains a limit as to how small each slot may be reduced because loading robots are commonly used to load tape cartridges into their slots. Loading robots typically comprise a support structure for supporting a tape cartridge to be loaded into a slot and a drive mechanism for pushing the tape into the slot. During loading, the tape is pushed away from the loading robot via the drive mechanism of the loading robot such that the entire tape cartridge eventually leaves the support structure and becomes fully loaded into the slot. These loading robots require adequate clearance for proper insertion of the tape cartridge through a receiving portion of each slot. Reducing the tolerance for clearance at the receiving portion of each slot would mean having to increase the performance accuracy of the loading robots, leading to increased costs of the loading robots and overall increased storage costs as a result of the required larger size of each slot.

SUMMARY

According to an exemplary aspect there is provided a slot for releasably storing a tape cartridge. The slot comprises an enlargeable receiving portion for releasable insertion of the tape cartridge and a plate for supporting the tape cartridge in the slot. At least a portion of the plate is moveable for enlarging the receiving portion.

The slot may further comprise an actuator for pivotably moving the plate between the first position and the second position. The actuator may be actuated by the tape cartridge and may be a resiliently biased lever that may be mounted on a shaft. The actuator may be adapted to rotatably engage the plate.

The plate may include a bump, the actuator being adapted to rotatably engage the bump. The plate may be for supporting a tape cartridge stored in a second slot. The second slot may be directly above the slot. The plate may be for supporting the tape cartridge stored in the slot.

The slot may further comprise a second rotatable plate for enlarging the receiving portion. The plate may be for supporting the tape cartridge stored in the slot. The second plate may be for supporting a tape cartridge stored in a second slot. The second slot may be directly above the slot. The actuator may be adapted to rotatably engage the second rotatable plate.

The actuator may be supported by a housing of the slot. The housing may include a rack wall. The actuator may be rotatable about the shaft. The shaft may be mounted to the rack wall.

The slot may further comprise a spring for returning the actuator to a rest position. The plate may be pivotally hinged to the housing.

The plate may comprise a moveable portion and a rigid portion, the moveable portion being pivotably connected to the rigid portion.

The plate may be configured for the moveable portion to move between a rest position, a first position on one side of the rest position, and a second position on another side of the rest position.

The moveable portion may be connected to the rigid portion via a living hinge. The slot may further comprise at least one spring for returning the moveable portion to the rest position.

According to another exemplary aspect there is provided a tape library comprising slots according to the above description.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings.

In the drawings.

DETAILED DESCRIPTION OF EXEMPLARY EMBODIMENTS

In order to minimize the size of each tape storage slot so as to maximize the number of tape cartridges that may be stored in a tape library, there is provided a tape magazine that allows tape cartridges to be slotted more closely together than is currently possible, while allowing proper insertion of each tape cartridge to be carried out by loading robots that are presently in use.

Figure 1:
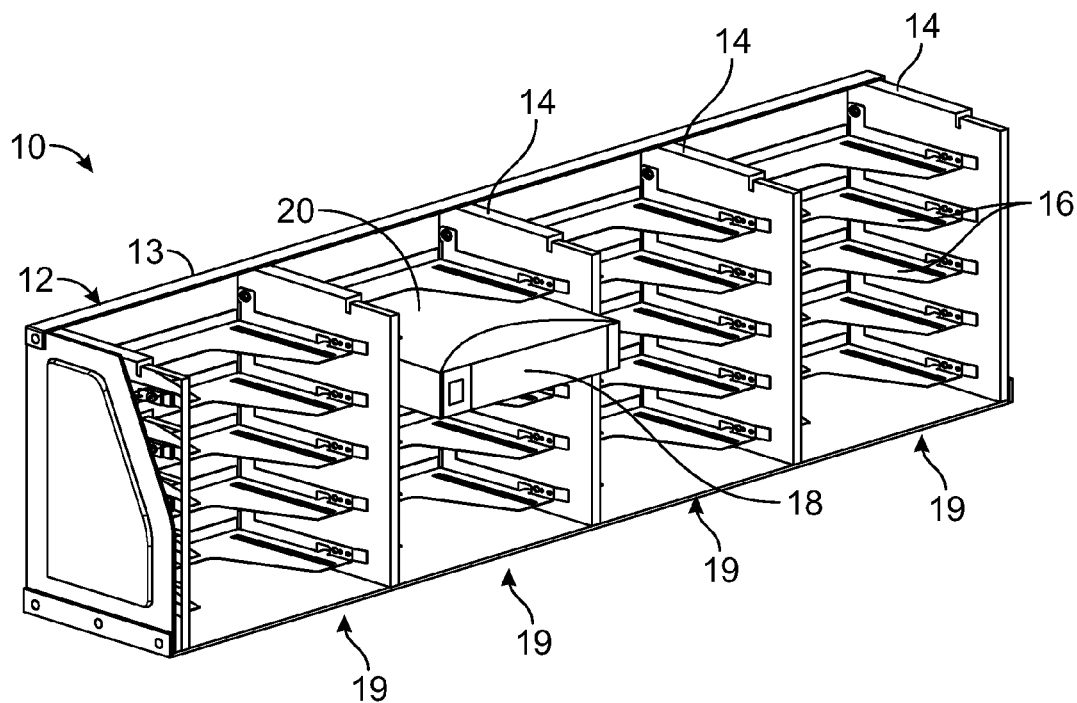
FIG. 1 is a perspective schematic view of a first exemplary embodiment of a tape magazine having a tape cartridge stored in a tape storage slot.

In a first preferred embodiment (FIGS. 1 to 6(b)), the tape magazine 10 comprises a housing 12 having rack walls 14 as shown in FIG. 1. A plurality of U-shaped plates 16 are attached to the housing 10 via the rack walls 14. Each plate 16 is for supporting a tape cartridge 18 in its slot 20. The magazine 10 may comprise a number of columns 19, each column 19 having a number of slots 20.

Figure 2:
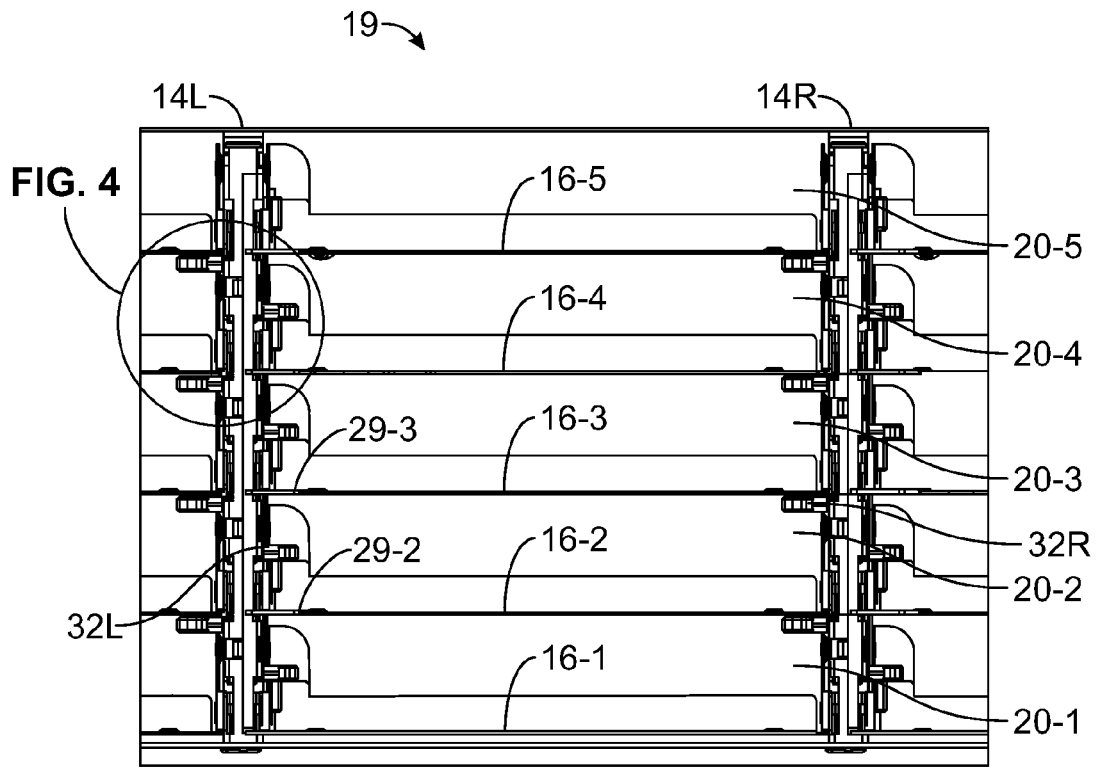
FIG. 2 is a schematic front elevational view of a single column of five tape slots of the tape magazine of FIG. 1.

FIG. 2 shows how, in a single column 19, each slot 20-1 to 20-5 is defined by a left rack wall 14L, a right rack wall 14R, and a bottom plate 16-1 to 16-5 respectively for supporting a tape cartridge in the slot. Each slot (e.g. slot 20-2) is also bound by a top plate (16-3). It will be appreciated that the top plate (16-3) of a first slot (20-2) is actually the bottom plate (16-3) of a second slot (20-3) directly above the first slot (20-2). The top plate (16-3) is thus for supporting a tape cartridge stored in the second slot (20-3).

Figure 3:
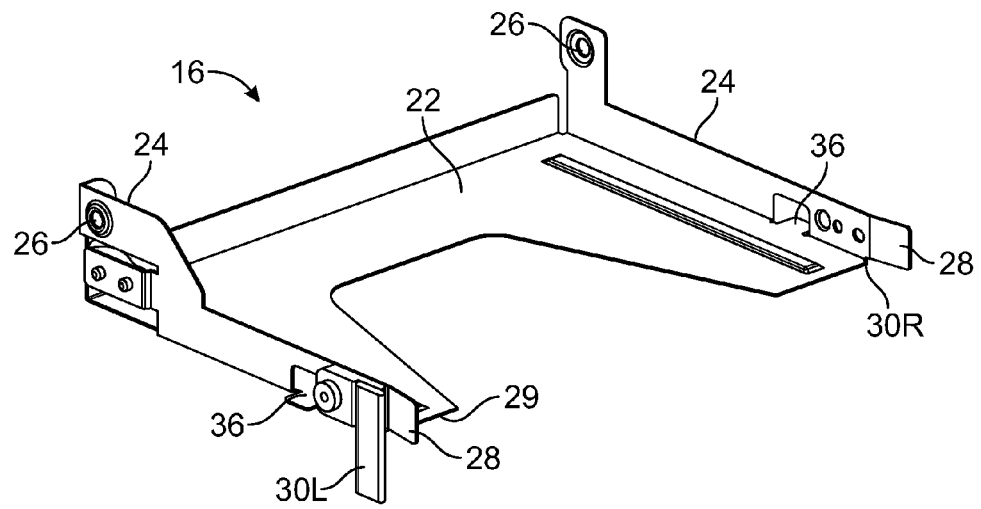
FIG. 3 is a perspective schematic view of a plate of the tape magazine of FIG. 1 for supporting a tape cartridge.

As shown in FIG. 3, each plate 16 comprises a base panel 22 for supporting a tape cartridge. The plate 16 also has side walls 24 having elevated hinge points 26 for pivotally connecting the plate 16 to adjacent rack walls 14. The plate 16 is therefore rotatable about the hinge points 26. Lead-in bends 28 may also be provided on the side walls 24 to help align an in-coming tape cartridge for proper placement onto the base panel 22. Datum tabs 36 may be provided on the base panel 22 for settling the plate 16 in a rest position. The datum tabs 36 typically engage stops (not shown) located at appropriate heights along the rack walls 14.

Referring to both FIGS. 2 and 3, the receiving portion of a slot 20 (e.g. 20-2) is thus the opening bound by a front edge 29 (e.g. 29-2) of the bottom plate 16 (e.g. 16-2), a corresponding front edge 29 (e.g. 29-3) of the top plate 16 (e.g. 16-3) as well as the lead-in bends 28 on the side walls 24 of the bottom plate 16 (e.g. 16-2).

Each plate 16 is provided with at least one bump 30. In the preferred embodiment shown in FIG. 3, the plate 16 is provided with a pair of bumps: a left bump 30L and a right bump 30R located adjacent the receiving portion of the slot 20. Each bump 30 projects downwardly of the plate 16 and is adapted to engage an actuator 32 mounted on the rack wall 14. A sloped or curved surface is preferably provided on the bump 30 for engaging the actuator 32. Alternatively, the sloped or curved surface may be provided on the actuator 32, or on both the actuator 32 and the bump 30.

Figure 4:
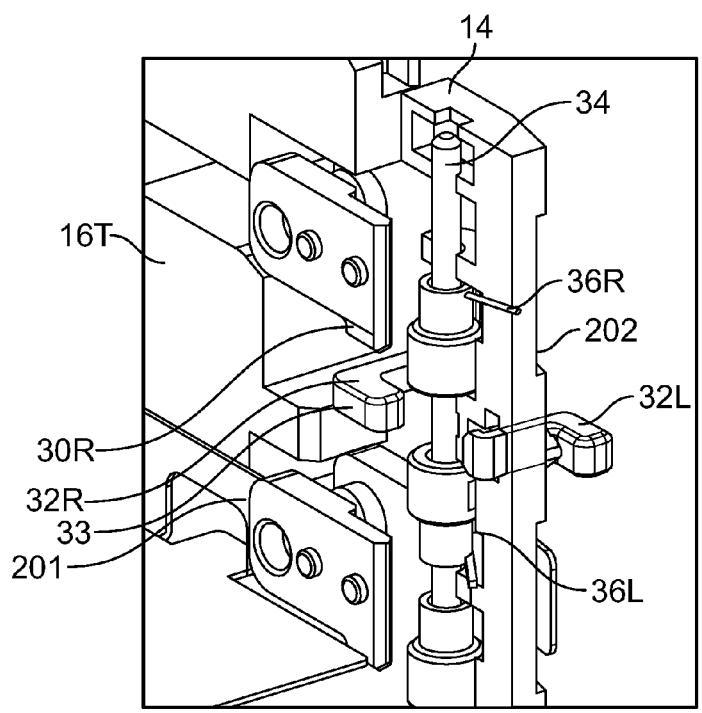
FIG. 4 is perspective schematic view of exemplary actuators of the tape magazine of FIG. 1.

In the preferred embodiment shown in FIG. 2, every slot (e.g. 20-2) is provided with a left actuator 32L and a right actuator 32R. FIG. 4 shows a close-up of a mechanism for rotating the plate 16 as encircled in FIG. 2. In FIG. 4, a right actuator 32R of a first slot 201 and a right bump 30R on a top plate 16T above the first slot 201 are visible. A left actuator 32L of a second slot 202 on the right of the first slot 201 can also be seen. Both the actuators 32R, 32L rotate about a shaft 34 supported by the rack wall 14. Each actuator 32R or 32L comprises a lever 33 resiliently biased by a torsion spring 36, shown as 36R and 36L for the individual actuators 32R and 32L respectively. The torsion spring 36 allows the actuator 32 to rotate towards the interior of the slot 20 upon application of an inward force on the lever 33. The actuator 32 is positioned so as to engage a bump 30 during rotation of the actuator 32. The torsion spring 36 returns the actuator 32 to its rest position when the force is removed. In use, the inward force is applied by an incoming tape cartridge that is being inserted at the receiving portion of the slot 20.

Figure 5A:
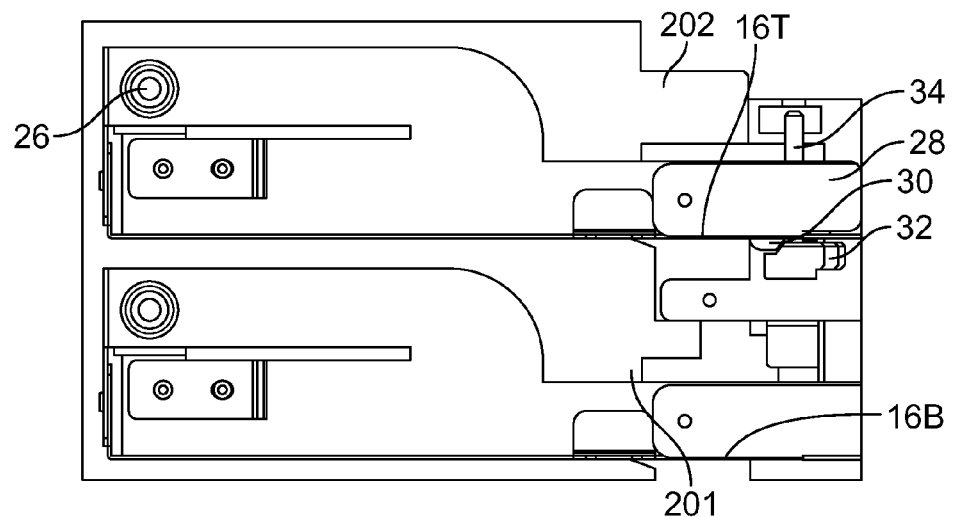
FIG. 5(a) is a schematic side view of an actuator of FIG. 4 before actuating a plate.
Figure 5B:
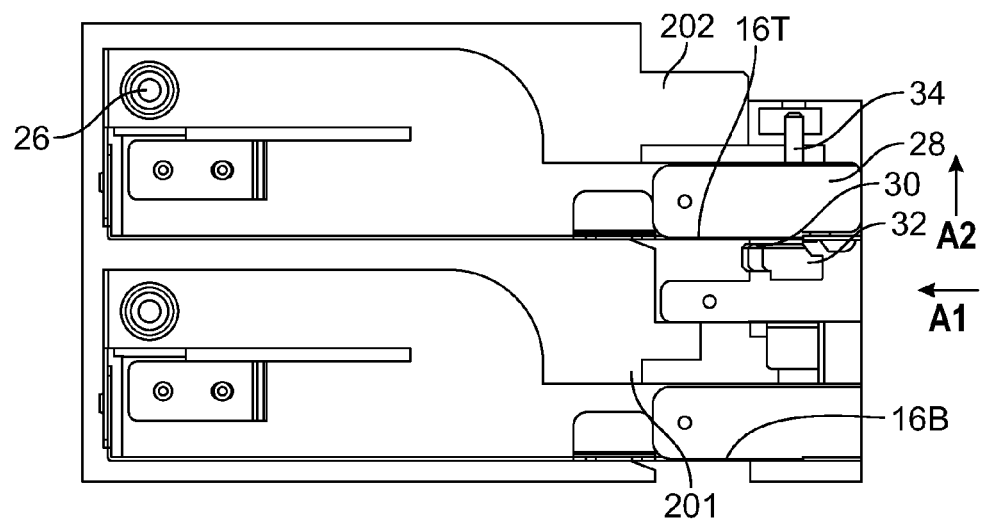
FIG. 5(b) is a schematic side view of the actuator of FIG. 5(a) after actuating the plate.

FIGS. 5(a) and 5(b) show the configurations of a slot 201 before and during actuation. The slot 201 is bound by its own bottom plate 16B and a top plate 16T. The top plate 16T forms the bottom plate of a second slot 202 that is directly above the slot 201. In this embodiment, the actuator 32 of the slot 201 is adapted to rotatably engage the bump 30 downwardly projecting from the top plate 16T.

Figure 6A:
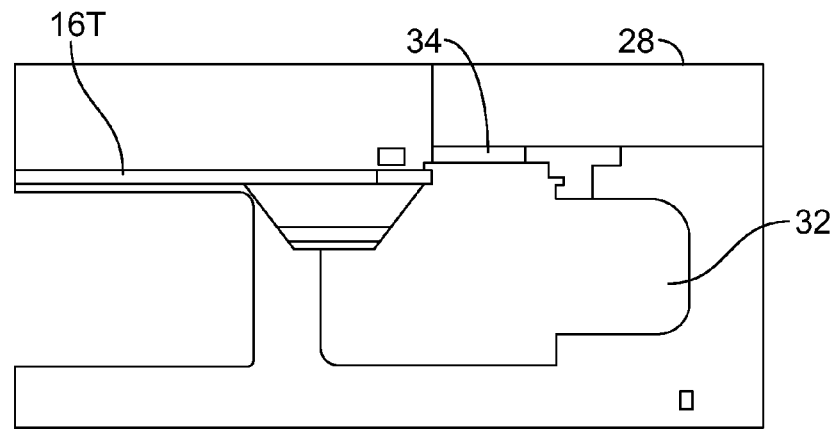
FIG. 6(a) is a close-up view of the actuator and a bump on the plate of FIG. 5(a)
Figure 6B:
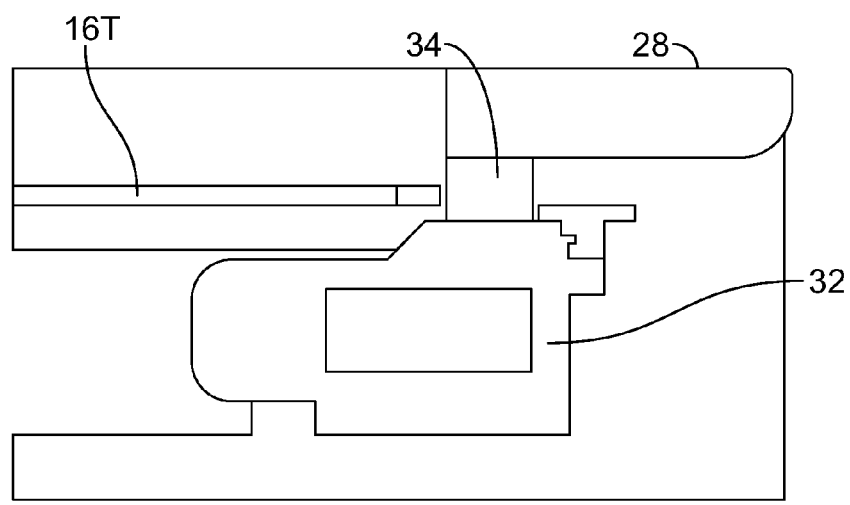
FIG. 6(b) is a close-up view of the actuator and a bump on the plate of FIG. 5(b)

FIG. 5(a) shows the slot 201 at rest in a first position. FIG. 6(a) shows a close-up of the actuator 32 and the bump 30 in the first position.

In FIG. 5(b), an incoming tape cartridge (not shown) in the direction shown by arrow A1 applies an inward force (arrow F) on the actuator 32. This causes the actuator 32 to rotate against the bump 30 on the top plate 16T, as shown in the close-up of FIG. 6(b). Because of the sloped or curved surface provided on the bump 30, the bump 30 acts as a cam on the actuator 32. This results in an upward rotating movement of the top plate 16T, lifting the top plate 16T in the direction shown by arrow A2. This upward rotating movement is made possible by the top plate 16T being free to rotate about the hinge point 26, as described before. Rotation of the top plate 16T thus lifts the top plate 16T to a second position. This enlarges the receiving portion of the slot 20, thereby providing the clearance needed by the loading robots for inserting the tape cartridge.

As the tape cartridge is inserted further into the slot 20, the actuator 32 rotates further inwards until it is no longer in contact with the bump 30. Under the force of gravity and a pair of biasing leaf springs (not shown), the top plate 16T accordingly rotates or falls back to its rest position as shown in FIG. 5(a). When the tape cartridge is removed from the slot 20, the actuator 32 rotates back to its rest position under the force of the torsion spring 36.

By providing a rotatable plate 16, although the slot 20 itself may have a very small tolerance for storing the tape cartridge 18 so as to pack more slots into a given tape library form factor, the receiving portion for inserting the tape cartridge may still be suitably enlarged for proper insertion of the tape cartridge by the loading robots.

Figure 7:
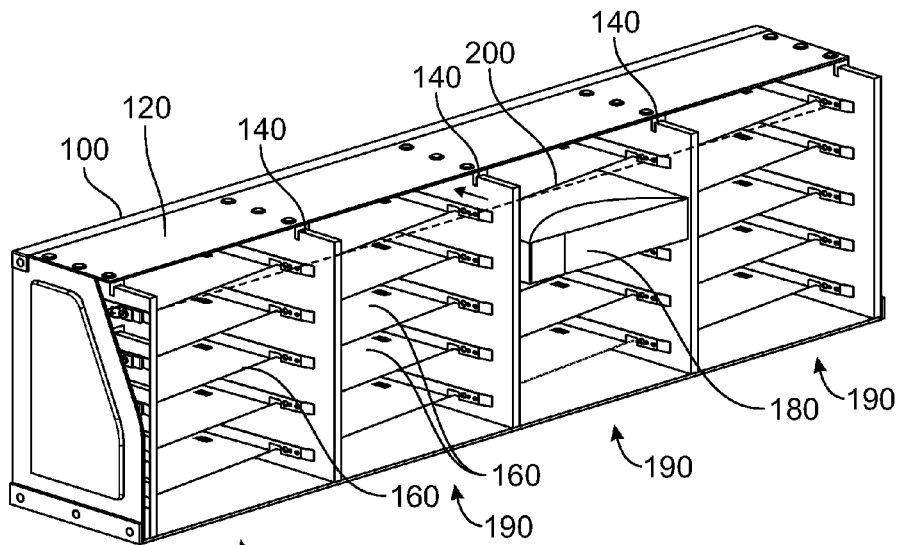
FIG. 7 is a perspective schematic view of a second exemplary embodiment of a tape magazine having a tape cartridge stored in a tape storage slot.

In a second embodiment (FIGS. 7 to 14(c)), the tape magazine 100 comprises a housing 120 having rack walls 140 as shown in FIG. 7. A plurality of plates 160 are attached to the housing 100 via the rack walls 140. Each plate 160 is for supporting a tape cartridge 180 in its slot 200. The magazine 100 may comprise a number of columns 190, each column 190 having a number of slots 200.

Figure 8:
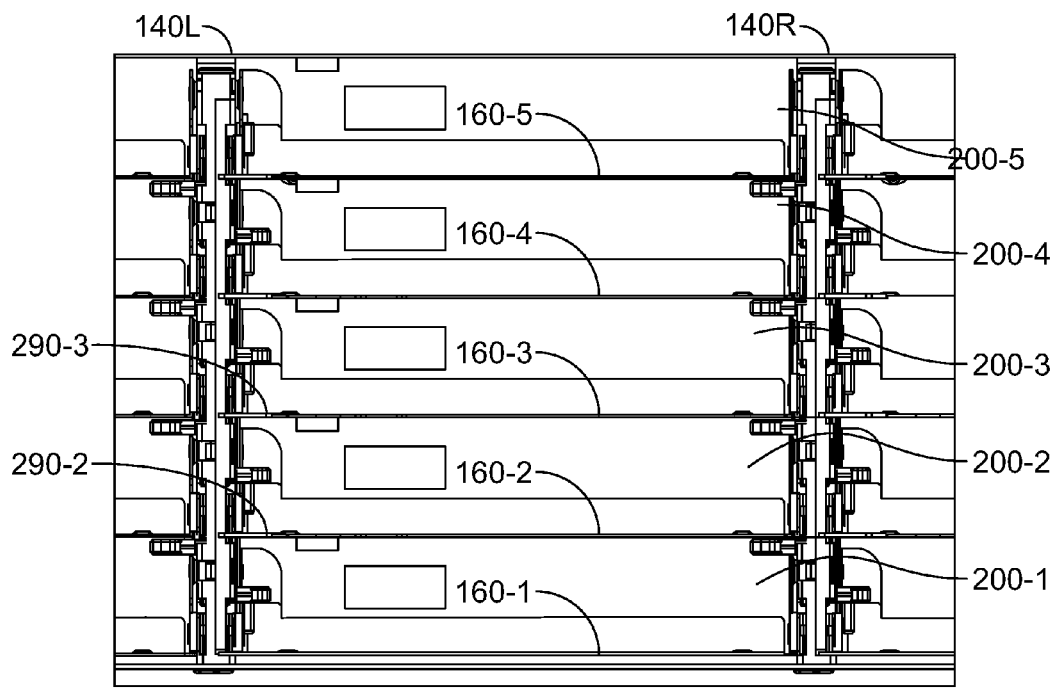
FIG. 8 is a schematic front elevational view of a single column of five tape slots of the tape magazine of FIG. 7.
Figure 9:
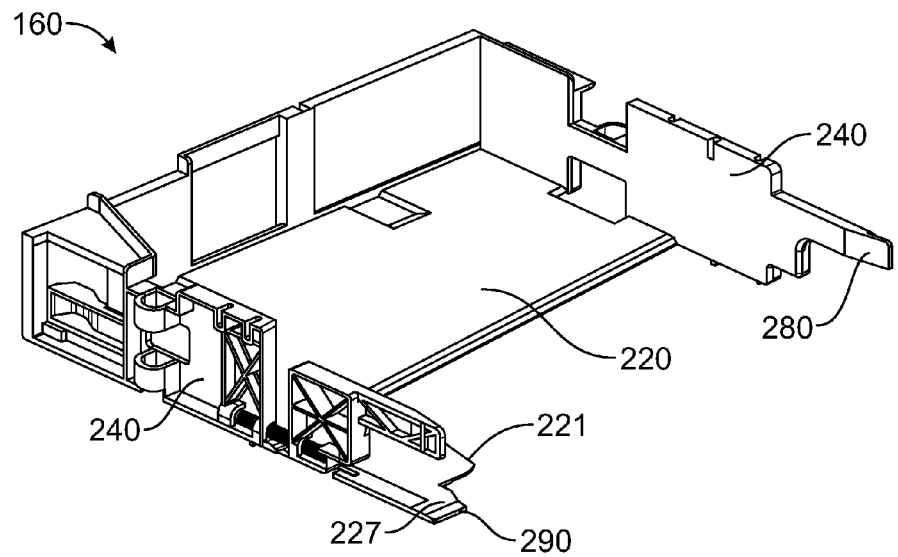
FIG. 9 is a right perspective schematic view of a plate of the tape magazine of FIG. 7 for supporting a tape cartridge.
Figure 10:
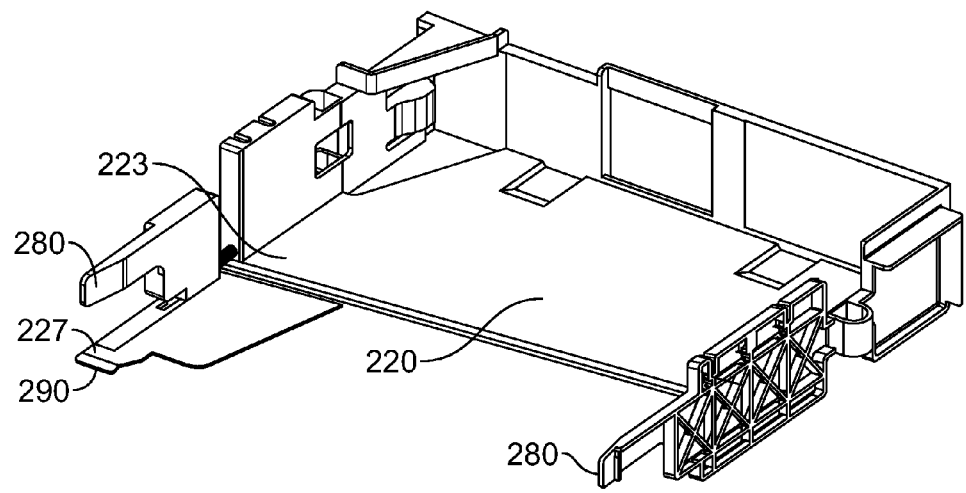
FIG. 10 is a left perspective schematic view of the plate of FIG. 9.
Figure 11:
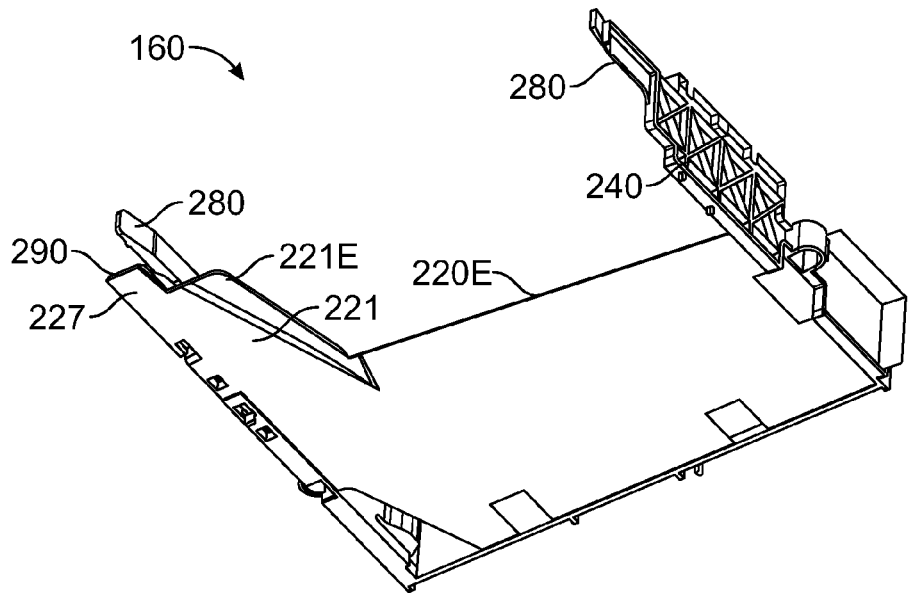
FIG. 11 is a bottom perspective schematic view of the plate of FIG. 9.

FIG. 8 shows how, in a single column 190, each slot 200-1 to 200-5 is defined by a left rack wall 140L, a right rack wall 140R, and a bottom plate 160-1 to 160-5 respectively for supporting a tape cartridge in the slot. Each slot (e.g. slot 200-2) is also bound by a top plate (160-3). It will be appreciated that the top plate (160-3) of a first slot (200-2) is actually the bottom plate (160-3) of a second slot (200-3) directly above the first slot (200-2). The top plate (160-3) is thus for supporting a tape cartridge stored in the second slot (200-3).

As shown in FIGS. 9-12, each plate 160 of the second embodiment comprises a rigid portion 220 for supporting a tape cartridge. The plate 160 also has side walls 240 for connecting the plate 160 to adjacent rack walls 140. Lead-in slopes 280 may be provided on the side walls 240 to help align an in-coming tape cartridge for proper placement onto the rigid portion 220. The plate 160 further comprises a moveable portion 221 for enlarging a receiving portion of the slot 200. The moveable portion 221 is preferably pivotably connected to the rigid portion 220.

As shown in FIGS. 8 to 12, the receiving portion of a slot 200 (e.g. 200-2) is thus the opening bound by a front edge 290 (e.g. 290-2) of the bottom plate 160 (e.g. 160-2), a corresponding front edge 290 (e.g. 290-3) of the top plate 160 (e.g. 160-3) as well as the lead-in bends 280 on the side walls 240 of the bottom plate 160 (e.g. 160-2).

Figure 12:
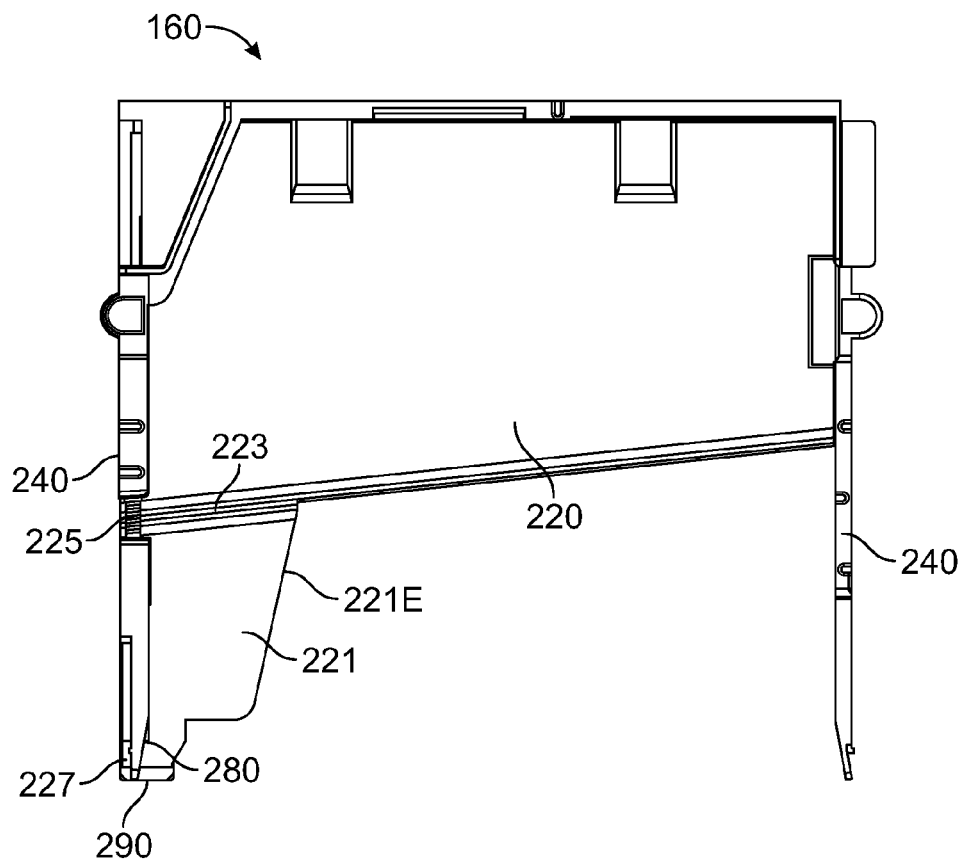
FIG. 12 is a top schematic view of the plate of FIG. 9.

As shown in FIGS. 7-14(c), the rigid portion 220 preferably has a receded lead-in edge 220E that is positioned to only encounter a tape cartridge 180 that is being inserted into the slot 200 just as a centroid of the tape cartridge 180 has left the support structure of the loading robot. In this way, movement of the tape cartridge 180 into the slot 200 is not hindered, and the tape cartridge 180 self-aligns itself into the slot 200 either as a result of gravity acting on the tape cartridge 180 or as a result of the tape cartridge 180 sliding against and being guided by the receded lead-in edge 220E while it is pushed into the slot 200 by the drive mechanism of the loading robot. Preferably, the receded lead-in edge 220E of the rigid portion 220 is not perpendicular to the side walls 240 (as shown in FIG. 12) so that contact of the tape cartridge 180 with the lead-in edge 220E gradually increases as the tape cartridge 180 is inserted into the slot 200. The rigid portion 220 thus has a trapezoidal shape. To cater for the feet of the tape cartridge 180, the lead-in edge 220E preferably has a chamfer of 0.8 mm.

Preferably, the moveable portion 221 is pivotably connected to the rigid portion 220 along a portion 223 of the lead-in edge 220E of the rigid portion 220 that is adjacent one of the side walls 240. The portion 223 is preferably formed as a compliant living hinge 223 between the moveable portion 221 and the rigid portion 220. A living hinge is a thin section of plastic that connects two parts together, the two parts being integral with each other. Preferably, the living hinge 223 has a thickness of about 0.4 mm. In this way, the moveable portion 221 is pivotable about the rigid portion 220 between a rest position, a first position on one side of the rest position, and a second position on another side of the rest position. The rest position is the position of the moveable portion 221 when there is no tape cartridge in the slot 200 or when a tape cartridge has been fully inserted into the slot 200. In a conventionally oriented tape magazine where the tape cartridges are stored horizontally, the first position is an upwardly displaced position from the rest position while the second position is a downwardly displaced position from the rest position.

The moveable portion 221 is preferably positioned on a side of the slot 200 where the lead-in edge 220E of the rigid portion 220 is advanced towards the receiving portion of the slot 200. In this way, an in-coming tape cartridge 180 first contacts a lead-in edge 221E of the moveable portion 221 before coming into contact with the lead-in edge 220E of the rigid portion 220. The moveable portion 221 preferably has a generally trapezoidal shape.

Figure 13A:
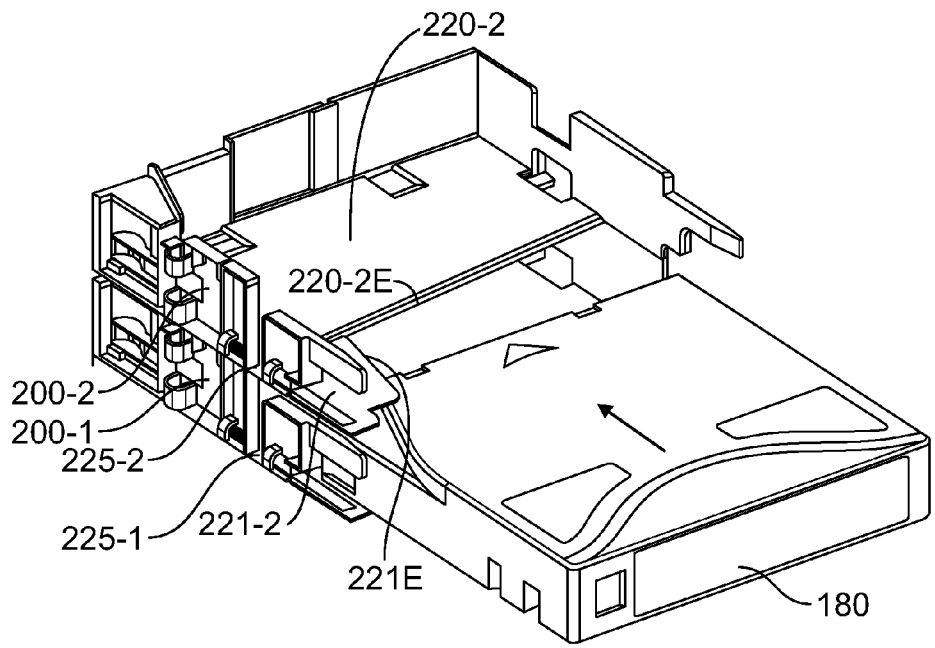
FIG. 13(a) is a perspective view of an upwardly misaligned tape cartridge contacting a compliant portion of the plate of FIG. 9.
Figure 13B:
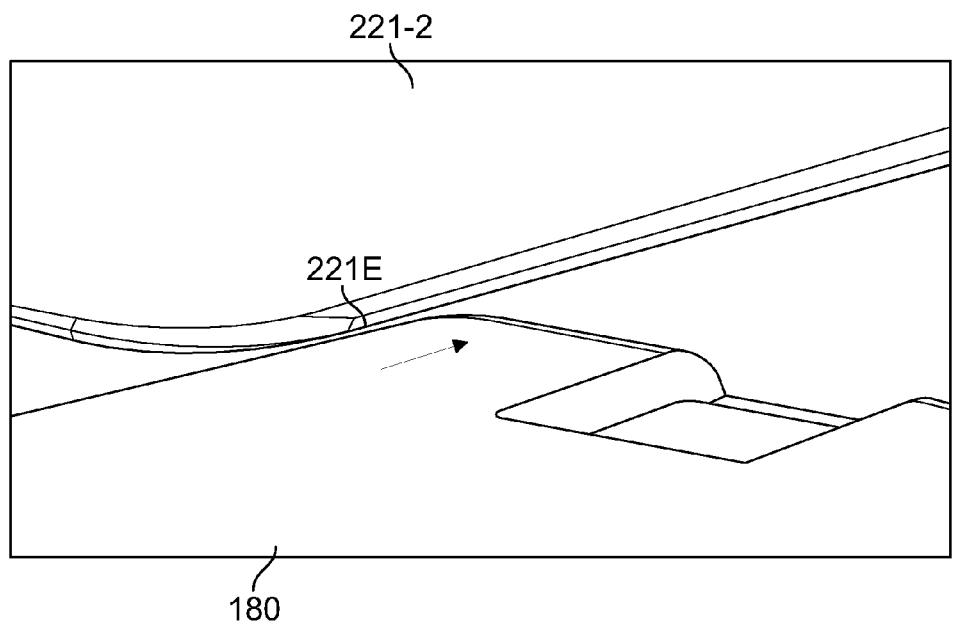
FIG. 13(b) is a close-up view of the upwardly misaligned tape cartridge contacting the compliant portion of the plate of FIG. 13(a)
Figure 13C:
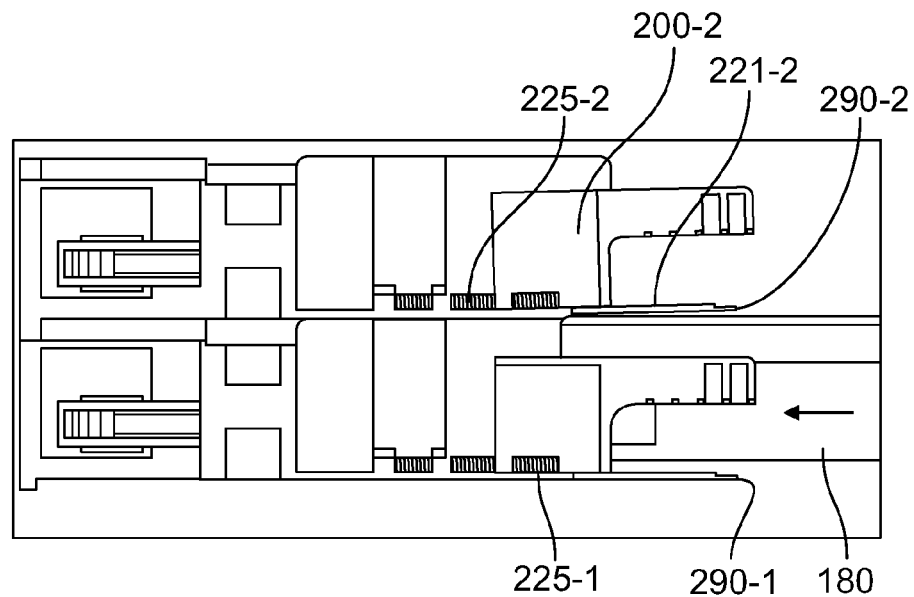
FIG. 13(c) is a schematic side view of the upwardly misaligned tape cartridge actuating the compliant portion of the plate of FIG. 13(a)

As shown in FIGS. 13(a)-(c), if the in-coming tape cartridge 180 is upwardly misaligned while the loading robot tries to insert it into a slot 200-1 in the direction indicated by the arrow, the tape cartridge 180 first contacts the lead-in edge 221E of a moveable portion 221-2 forming part of a slot 200-2 that is directly above the slot 200-1 where the tape cartridge 180 is meant to be inserted into. As the tape cartridge 180 is pushed into the slot 200-1, contact of the tape cartridge 180 against the moveable portion 221-2 causes the moveable portion 221-2 to pivot with respect to the rigid portion 220-2 and move to an upwardly displaced position (FIG. 13(c)). The moveable portion 221-2 is therefore actuated by the in-coming tape cartridge 180. In this way, the front edge 290-2 of the plate 160 forming the slot 200-2 above the intended slot 200-1 is raised, thereby enlarging the receiving portion of the slot 200-1 that the tape cartridge 180 is being inserted into.

Figure 14A:
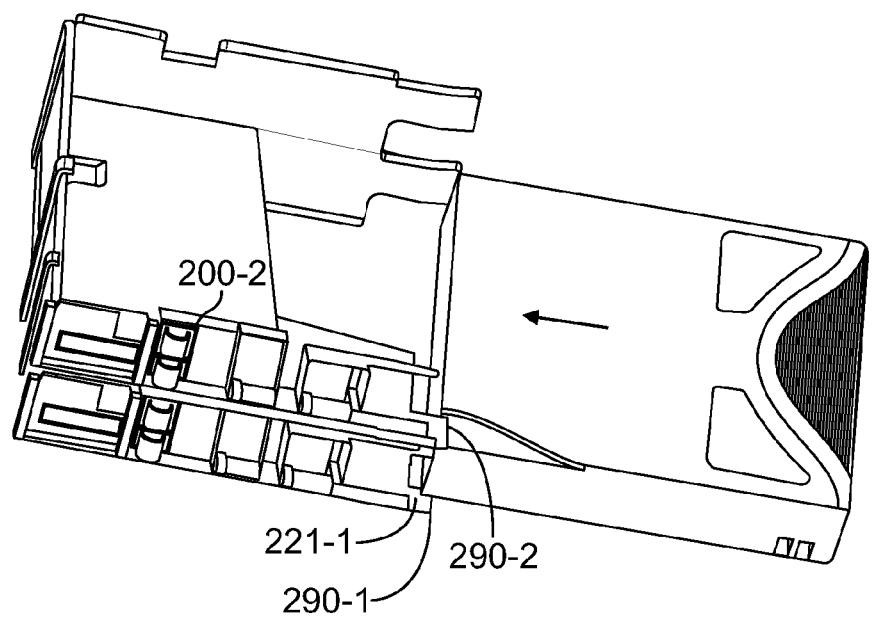
FIG. 14(a) is a perspective view of a downwardly misaligned tape cartridge contacting a compliant portion of the plate of FIG. 9.
Figure 14B:
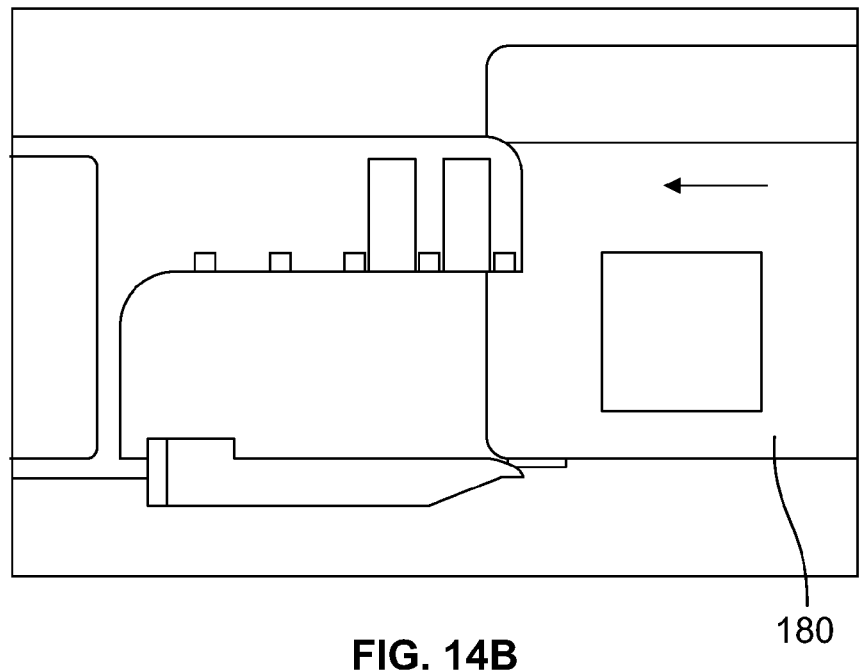
FIG. 14(b) is a close-up view of the downwardly misaligned tape cartridge contacting the compliant portion of the plate of FIG. 14(a)
Figure 14C:
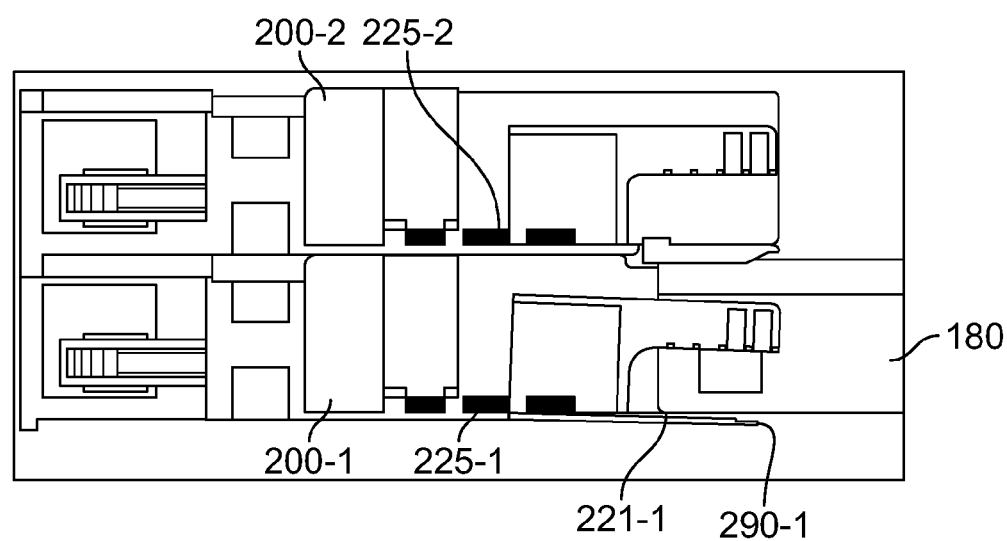
FIG. 14(c) is a schematic side view of a downwardly misaligned tape cartridge actuating the compliant portion of the plate of FIG. 14(a).

As shown in FIGS. 14(a)-(c), if the in-coming tape cartridge 180 is downwardly misaligned while the loading robot tries to insert it into a slot 200-1 in the direction indicated by the arrow, the tape cartridge 180 first contacts the lead-in edge 221E of the moveable portion 221-1 of the slot 200-1 that the tape cartridge is being inserted into. As the tape cartridge 180 is pushed into the slot 200-1, contact of the tape cartridge 180 against the moveable portion 221-1 causes the moveable portion 221-1 to pivot with respect to the rigid portion 220-1 (hidden) and move to a downwardly displaced position (FIG. 14(c)). The moveable portion 221-1 is therefore actuated by the in-coming tape cartridge 180. In this way, the front edge 290-1 of the plate 160 forming the intended slot 200-1 is lowered, thereby enlarging the receiving portion of the slot 200-1 that the tape cartridge 180 is being inserted into.

When the tape cartridge 180 has been fully inserted into the slot 200, the moveable portion 221 has returned to its rest position as a result of the natural compliance of the living hinge 223. However, as plastic tends to creep permanently and deform as a result of fatigue after a number of cycles of use, a returning means 225 such as a garter spring 225 may be provided to ensure that the moveable portion 221 is always biased towards its rest position in case of the living hinge 223 losing its natural compliance with time and use. Preferably, one end of the garter spring 225 is connected to the rigid portion 220 while another end of the garter spring 225 is connected to the moveable portion 221.

The moveable portion 221 may further be provided with an adaptor for position sensing by the loading robot for vertical as well as horizontal position sensing. The adaptor is preferably made of a reflective plastic chrome material. The adaptor is preferably configured to snap onto a foremost part of the moveable portion 221 at a front edge 290 of the plate 160 such that first contact of an in-coming tape cartridge 180 would be with the adaptor on the moveable portion 221.

By providing a plate 160 that has a moveable portion 221, although the slot 200 itself may have a very small tolerance for storing the tape cartridge 180 so as to pack more slots into a given tape library form factor, the receiving portion for inserting the tape cartridge may still be suitably enlarged for proper insertion of the tape cartridge by the loading robots.

Whilst there has been described in the foregoing description exemplary embodiments of the present invention, it will be understood by those skilled in the technology concerned that many variations in details of design, construction and/or operation may be made without departing from the present invention. For example, in the first embodiment, the rotatable plates may be configured for hinging to a back wall of the housing instead of the rack walls on each side of the plates. The plates may have upwardly projecting bumps, so that rotation of the actuator enlarges the opening of the slot by pushing down the bottom plate instead of pushing up the top plate. Alternatively, the rotatable plates may have both upwardly as well as downwardly projecting bumps so that two plates are rotated for enlarging the receiving portion of each slot, i.e., the actuator pushes up the top plate as well as pushes down the bottom plate of the slot. In a further alternative, there need not be any bumps provided on the plates at all so long as an appropriately adapted actuator is provided to rotationally lift or lower each plate as the case may be. Different biasing means such as a leaf spring may be provided to return the actuator to the rest position.

The invention claimed is:

1. A slot for releasably storing a tape cartridge, the slot comprising:
    an enlargeable receiving portion forming at least a portion of an opening into the slot for releasable insertion of the tape cartridge; and
    a plate for supporting a tape cartridge in the slot or in an adjacent slot;
    wherein at least a portion of the plate is moveable for enlarging the receiving portion to receive a tape cartridge moving into the slot.
2. The slot of claim 1, further comprising an actuator for pivotably moving the plate between a first position and a second position.
3. The slot of claim 2, wherein the actuator is actuated by the tape cartridge.
4. The slot of claim 2, wherein the actuator comprises a resiliently biased lever.
5. The slot of claim 4, wherein the resiliently biased lever is mounted on a shaft.
6. The slot of claim 2, wherein the actuator is adapted to rotatably engage the plate.
7. The slot of claim 2, wherein the plate includes a bump, the actuator being adapted to rotatably engage the bump.
8. The slot of claim 2, wherein the plate is for supporting a tape cartridge stored in a second slot, the second slot being directly above the slot.
9. The slot of claim 2, wherein the plate is for supporting the tape cartridge stored in the slot.
10. The slot of claim 2, further comprising a second rotatable plate for enlarging the receiving portion; wherein the plate is for supporting the tape cartridge stored in the slot and the second plate is for supporting a tape cartridge stored in a second slot, the second slot being directly above the slot.
11. The slot of claim 10 wherein the actuator is adapted to rotatably engage the second rotatable plate.
12. The slot of claim 2, wherein the actuator is supported by a housing of the slot.
13. The slot of claim 12, wherein the housing includes a rack wall.
14. The slot of claim 1 further comprising an actuator for pivotably moving the plate between a first position and a second position, the actuator is supported by a housing of the slot, the actuator comprises a resiliently biased lever, the resiliently biased lever is mounted on a shaft, the housing includes a rack wall, wherein the actuator is rotatable about the shaft, the shaft being mounted to the rack wall.
15. The slot of claim 2, further comprising a spring for returning the actuator to a rest position.
16. The slot of claim 2, wherein the plate is pivotally hinged to the housing.
17. The slot of claim 1, wherein the plate comprises a moveable portion and a rigid portion, the moveable portion being pivotably connected to the rigid portion.
18. The slot of claim 17, wherein the plate is configured for the moveable portion to move between a rest position, a first position on one side of the rest position, and a second position on another side of the rest position.
19. The slot of claim 17, wherein the moveable portion is connected to the rigid portion via a living hinge.
20. The slot of claim 17, further comprising at least one spring for returning the moveable portion to the rest position.
21. The slot of claim 17, wherein the moveable portion is actuated by the tape cartridge.
22. The slot of claim 1 wherein the slot is part of a tape library.
23. The slot of claim 1 wherein the plate generally extends across the opening from a left side to a right side of the opening.
24. The slot of claim 1 wherein the plate extends to form a bottom side of the slot and extends underneath a bottom surface of a tape cartridge in the slot.
25. The slot of claim 1 wherein the plate extends to form a top side of the slot and extends over a top surface of a tape cartridge in the slot.

* * * * *